United States Patent [19]

Mastrolia

[11] Patent Number: 5,415,366
[45] Date of Patent: May 16, 1995

[54] ARM RESTRAINT

[75] Inventor: Bradley Mastrolia, Buena Park, Calif.

[73] Assignee: McDonnell Douglas Corporation, St. Louis, Mo.

[21] Appl. No.: 204,860

[22] Filed: Feb. 28, 1994

[51] Int. Cl.⁶ ............................................ B64D 25/115
[52] U.S. Cl. ................................................ 244/122 AG
[58] Field of Search ....... 244/122 R, 122 A, 122 AG, 244/122 B, 121

[56] References Cited

U.S. PATENT DOCUMENTS

| | | | |
|---|---|---|---|
| 2,836,382 | 5/1960 | Martin | 244/122 AG |
| 3,083,938 | 4/1963 | Brinkworth et al. | |
| 3,202,384 | 8/1965 | Martin | 244/122 AG |
| 4,081,156 | 3/1978 | Ideskar | |
| 4,179,086 | 12/1979 | Yamada | |
| 4,215,835 | 8/1980 | Wedgwood | |
| 4,359,200 | 11/1982 | Brevard et al. | |
| 4,482,112 | 11/1984 | Cummings | |
| 4,592,523 | 6/1986 | Herndon | |
| 4,667,902 | 5/1987 | Zenobi | |
| 4,676,462 | 6/1987 | Martin | |

FOREIGN PATENT DOCUMENTS

| | | | |
|---|---|---|---|
| 2434375 | 2/1975 | Germany | 244/122 AG |
| 1008477 | 10/1965 | United Kingdom | 244/122 AG |
| 1570283 | 6/1980 | United Kingdom | |

OTHER PUBLICATIONS

H 115, Lorch, Published Aug. 5, 1986 (U.S. Statutory Invention Registration).

Primary Examiner—Galen L. Barefoot
Attorney, Agent, or Firm—Blakely, Sokoloff, Taylor & Zafman

[57] ABSTRACT

An arm restraint system for an ejection seat of an aircraft. The arm restraint system includes a pair of shrouds that are attached to the seat and each contain an outer channel. Extending through each outer channel is a corresponding strap that is coupled to the cockpit and fastened to a ring on the belt of the pilot. When the seat is ejected, the straps are pulled and the shrouds are deployed onto the arms of the pilot. The shrouds extend to a position which captures the wrists of the pilot, thereby preventing both sideward and upward movement of the arms.

14 Claims, 3 Drawing Sheets

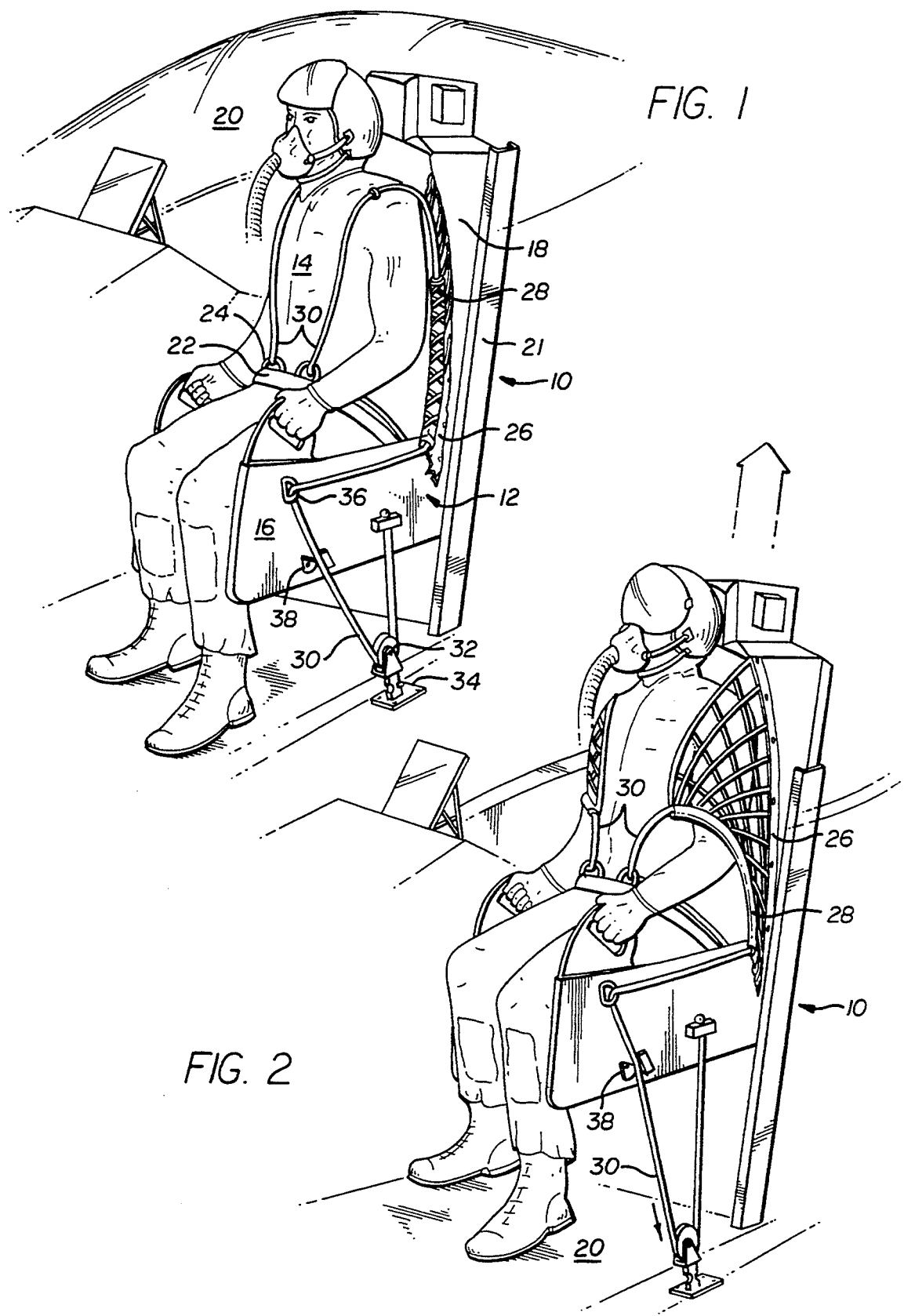

ARM RESTRAINT

BACKGROUND OF THE INVENTION

1. Field of the Invention

The present invention relates to an arm restraint for the ejection seat of an aircraft.

2. Description of Related Art

Military aircraft are typically equipment with an ejection seat that can catapult the pilot from the cockpit of the plane. The aircraft is typically traveling at high speeds such that the pilot is subjected to a wind blast when the seat is ejected. The wind blast and subsequent travel by the seat may cause the arms of the pilot to flail about, thereby exposing the pilot to possible injury. It is therefore desirable to provide an arm restraint with the ejection seat to prevent movement of the pilots arms when the seat is ejected.

U.S. Pat. No. 4,179,086 issued to Yamada; U.S. Pat. No. 4,592,523 issued to Herndon; U.S. Pat. No. 4,081,156 issued to Ideskar; U.S. Pat. No. 4,215,835 issued to Wedgwood; U.S. Pat. No. 4,667,902 issued to Zenobi; U.S. Pat. No. 4,676,462 issued to Martin; U.S. Pat. No. 3,083,938 issued to Brinkwirth et al.; U.S. Pat. No. 4,359,200 issued to Brevard et al. and Great Britain Patent No. 1,570,283 issued to Barton et al., all disclose ejection seats with arm restraints that restrain the movement of the pilots arms when the seat is ejected.

The Yamada reference discloses an arm restraint that includes a pair of straps that extend through a series of rings and are initially looped through detachable flaps located on the shoulders of the pilot. The ends of the straps are attached to the cockpit of the plane. When the seat is ejected, the straps are pulled tight along the sides of the pilots arms. Although the Yamada arm restraint restricts the pilots arms from moving sideways, the straps do not prevent the arms from moving upward toward the head of the pilot.

The Herndon reference discloses a restraint system that contains straps and netting which cocoon the pilot when the seat is ejected. The Herndon restraint system requires a number of guide members and a firing device that are complex in operation and expensive to produce. It would be desirable to provide a simple arm restraint system for an ejection seat that would prevent the pilots arms from moving in either a sideward or upward direction.

SUMMARY OF THE INVENTION

The present invention is an arm restraint system for an ejection seat of an aircraft. The arm restraint system includes a pair of shrouds that are attached to the seat and each contain an outer channel. Extending through each outer channel is a corresponding strap that is coupled to the cockpit and fastened to a ring on the belt of the pilot. When the seat is ejected, the straps are pulled and the shrouds are deployed onto the arms of the pilot. The shrouds extend to a position which captures the wrists of the pilot, thereby preventing both sideward and upward movement of the arms.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of an ejection seat with an arm restraint system of the present invention;

FIG. 2 is a perspective view showing the arm restraint partially deployed;

DETAILED DESCRIPTION OF THE INVENTION

Figures 3, 4:
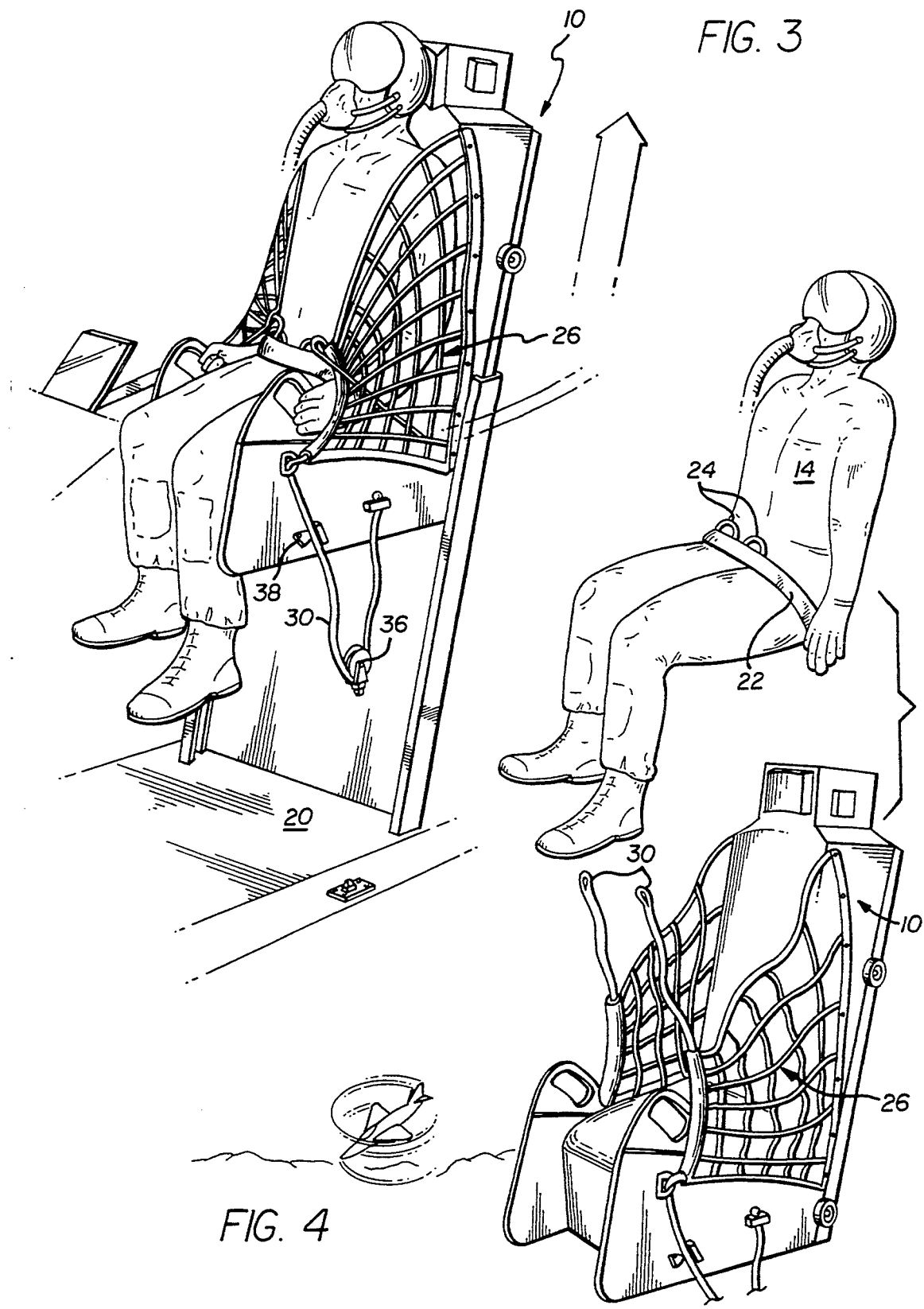
FIG. 3 is a perspective view showing the arm restraint fully deployed.
FIG. 4 is a perspective view showing the pilot released from the seat.

Referring to the drawings more particularly by reference numbers, FIG. 1 shows an ejection seat 10 which has an arm restraint system 12 of the present invention. The seat 10 supports a pilot 14 and includes both a seat portion 16 and a back portion 18. The ejection seat 10 is located within the cockpit 20 of an aircraft. The seat 10 has an engine (not shown) that can propel the pilot through the canopy and out of the cockpit. The seat 10 is typically guided out of the cockpit by rails 21. The pilot 14 wears a parachute harness with a belt section 22 that has a pair of rings 24.

The arm restraint system 12 includes a pair of shrouds 26 attached to the seat 10 along the back portion 18. The shrouds 26 are preferably constructed as a net that is both flexible and strong. The shrouds 26 are typically attached to the seat 10 with studs or other means to fasten the members 26. Each shroud has an outer channel 28 formed therein.

Extending through the outer shroud channels 28 are a pair of straps 30. Each strap 30 has one end fastened to a ring 24 of the pilots belt 22 and an opposite end attached to the seat 10. The straps 30 are coupled to the cockpit 20 by pulleys 32. The pulleys 32 each have a weakened bracket section 34 which allows the straps 30 to be detached from the cockpit 20 when the seat is ejected. As an alternate embodiment, the straps 30 can be fastened directly to the cockpit 20 without the pulleys 32.

The straps 30 are guided from the pulleys 32 to the shrouds 26 by guide rings 36 located at the front of the seat section 16. The restraint system 12 also has a pair of snubbers 38 that allow the straps 30 to move in one direction, but prevent strap movement in an opposite direction.

FIGS. 1-4 show the operation of the arm restraint system 10. As shown in FIG. 1, the straps 30 initially extend through the shrouds 26 and over the shoulders of the pilot 14. When seat ejection is initiated, the seat 10 moves away from the cockpit 20. Movement of the seat 10 pulls the straps 30 in the direction indicated by the arrows in FIG. 2. The snubbers 38 slightly rotate to allow the straps 30 to be pulled away from the seat 10.

Pulling the straps 30 causes the shrouds 26 to be deployed from the seat 10. The straps 30 move off of the pilots shoulders so that the shrouds 26 move down the arm of the pilot. As shown in FIG. 3, when fully deployed the shrouds 26 capture the pilots wrists and a portion of the arms. Capturing the pilots wrists prevents the arms from moving in either a sideward or upward motion. The arm restraint system of the present invention thus entirely restricts the movement of the pilots arms when the seat is ejected. Restricting the arms reduces the risk of injury to the pilot during flight.

As shown in FIG. 3, the seat 10 moves until the shrouds 26 are fully deployed and the pulleys 32 break away from the cockpit 20. The snubbers 38 prevent the straps 30 from moving in the opposite direction, so that the shrouds 26 remain deployed during flight. As shown in FIG. 4, the pilot 14 eventually becomes released from the seat 10, typically when the parachute is deployed. The straps 30 are fastened to the rings 24 so that the straps 30 become detached from the belt 22 when the pilot releases from the seat 10.

Figure 5:
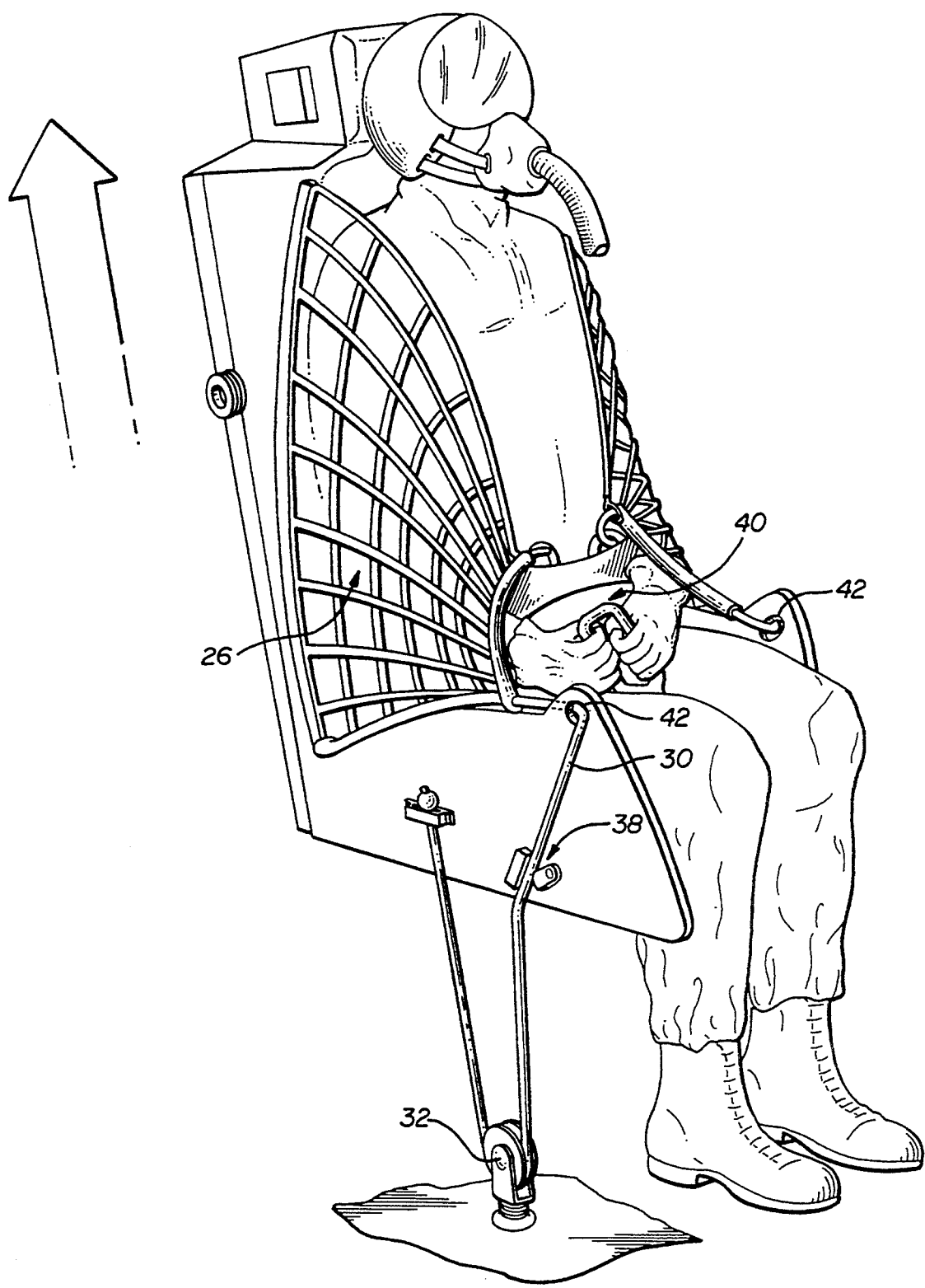
FIG. 5 is an alternate embodiment showing an arm restraint on an ejection seat with a center pull lever.

FIG. 5 shows an alternate embodiment of an arm restraint on an ejection seat with a center pull lever 40. The straps 30 are guided from the snubbers 38 to the shrouds 26 by guide holes 42 located at forward top locations of the seat portion 16. The deployed shrouds 26 capture the wrists of the pilot. The shrouds 26 also restrict movement of the pilots legs, wherein the shrouds 26 become a limb restraint.

What is thus provided is an arm restraint system for an ejection seat that is simple to assemble, inexpensive to produce and fully restrains the arms of the pilot.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. Am arm restraint system for an ejection seat that supports a pilot with a belt that has a pair of rings, comprising:
    a pair of shrouds attached to the ejection seat, each shroud having an outer channel;
    a pair of straps that extend through said outer channels of said shrouds and are attached to the belt rings; and,
    pull means for pulling said straps and deploying said shrouds such that said shrouds capture the wrists of the pilot.

2. The arm restraint system as recited in claim 1, wherein said pull means includes coupling said straps to a cockpit such that said straps pull said shroud when the ejection seat is ejected.

3. The arm restraint system as recited in claim 2, wherein said pull means includes a pair of snubbers which prevent movement of said straps in a reverse direction.

4. The arm restraint system as recited in claim 2, wherein said pull means includes a pair of guide rings attached to the ejection seat and which guide said straps.

5. The arm restraint system as recited in claim 2, wherein said pull means includes attaching said straps to the ejection seat and a pair of pulleys that couple said straps to the cockpit.

6. The arm restraint system as recited in claim 1, wherein said shrouds are each constructed as a net.

7. An ejection seat that supports a pilot with a belt that has a pair of rings, comprising:
    an ejection seat that has a seat portion and a back portion;
    a pair of shrouds attached along said back portion of said ejection seat, each shroud having an outer channel;
    a pair of straps that extend through said outer channels of said shrouds and are attached to the belt rings; and,
    pull means for pulling said straps and deploying said shrouds such that said shrouds capture the wrists of the pilot.

8. The ejection seat as recited in claim 7, wherein said pull means includes coupling said straps to a cockpit such that said straps pull said shroud when said ejection seat is ejected.

9. The ejection seat as recited in claim 8, wherein said pull means includes a pair of snubbers which prevent movement of said straps in a reverse direction.

10. The ejection seat as recited in claim 8, wherein said pull means includes a pair of guide rings attached to said ejection seat and which guide said straps.

11. The ejection seat as recited in claim 8, wherein said pull means includes attaching said straps to said ejection seat and a pair of pulleys that couple said straps to the cockpit.

12. The arm restraint as recited in claim 7, wherein said shrouds are each constructed as a net.

13. A method for deploying an arm restraint on an ejection seat that supports a pilot, comprising the steps of:
    a attaching a pair of straps to a pair of belt rings worn by the pilot, wherein said straps extend through a pair of outer channels of a pair of shrouds that are mounted to the ejection seat;
    b pulling said pair of straps that extend through said pair of shrouds such that said shrouds capture the wrists of the pilot.

14. The method as recited in claim 13, wherein said straps are pulled by a movement of the ejection seat.

* * * * *

UNITED STATES PATENT AND TRADEMARK OFFICE
CERTIFICATE OF CORRECTION

PATENT NO. : 5,415,366
DATED : May 16, 1995
INVENTOR(S) : Mastrolia

It is certified that error appears in the above-identified patent and that said Letters Patent is hereby corrected as shown below:

In Claim 1 in column 3 at line 29 delete "Am arm restraint" insert --An arm restraint--

Signed and Sealed this

Twenty-seventh Day of February, 1996

Attest:

BRUCE LEHMAN

Attesting Officer     Commissioner of Patents and Trademarks